United States Patent

[11] 3,584,813

| [72] | Inventors | Thomas E. Sweeney<br>61 Overbrook Drive, Princeton, N.J. 08540;<br>Robert A. Ormiston, 151 Calderon Ave. Apt. 112, Mountain View, Calif. 94040;<br>Walter Barry Nixon, 30 Merritt Drive, Trenton, N.J. 08638 |
|---|---|---|
| [21] | Appl. No. | 741,826 |
| [22] | Filed | June 26, 1968 |
| [45] | Patented | June 15, 1971 |

[54] AIRFOIL BRIDLE APPARATUS
6 Claims, 5 Drawing Figs.

[52] U.S. Cl. .................................................. 244/44,
244/38, 244/123
[51] Int. Cl. ........................................................ B64c 3/44,
B64c 1/26
[50] Field of Search .......................................... 244/44
(FWD), 43, 47, 48, 38, 123

[56] References Cited
UNITED STATES PATENTS

| 2,288,829 | 7/1942 | Newman ...................... | 244/38X |
| 1,856,578 | 5/1932 | Miguel et al. ................. | 244/44 |
| 3,310,261 | 3/1967 | Rogallo et al. ................ | 244/44 |

*Primary Examiner*—Milton Buchler
*Assistant Examiner*—Jeffrey L. Forman
*Attorney*—Darby & Darby ABSTRACT: The present invention relates to a bridle assembly for use with a semirigid airfoil supported by an aircraft fuselage. The airfoil includes a spar defining a rigid leading edge, a cable defining a trailing edge, and flexible material interconnecting the spar and cable and defining a spanwise camber distribution. The bridle assembly includes at least one bridle cable secured to the airfoil trailing edge cable, with the assembly being secured in tension to the fuselage, to create tension in the airfoil flexible material and retard changes in its camber distribution.

PATENTED JUN 15 1971 3,584,813

INVENTORS
THOMAS E. SWEENEY
ROBERT A. ORMISTON
WALTER BARRY NIXON

Darby & Darby
ATTORNEYS

AIRFOIL BRIDLE APPARATUS

This invention relates to semirigid airfoil structures or sailwings and more particularly to bridle apparatus for use with a sailwing.

The use of airfoils of semirigid construction in which a rigid spar supports a flexible wing form dates back to the early days of flight. Novel improvements in such structures, including arrangements for warping and/or folding semirigid airfoils, are disclosed in pending application for U.S. Letters Pat. entitled SemiRigid Airfoil For Airborne Vehicles, Ser. No. 740,895 filed June 28, 1968.

In airfoils supported from airborne vehicles of the spar and trailing-edge cable type forming a semirigid construction wherein a flexible material defines its aerodynamic form, an increase in the camber or curvature of the mean line of the airfoil leading edge to trailing edge is experienced at relatively high speeds. This wing camber results from lower air pressure on the upper surface of the flexible material than on the lower surface due to the classical Bernoulli effects. This increase in airfoil camber is accompanied by increases in drag. It is known that increases in camber will also result in increases in lift which, in turn, result in increases in drag induced by the downwash.

In many types of aircraft it is desirable to obtain higher L/D (lift-drag) ratios for an airfoil structure in order to increase wing efficiencies. Increases in drag at points along the span of a semirigid airfoil resulting from wing flexure will yield undesirable nonuniform decreases in the lift to drag (L/D) ratio affecting the airfoil lift pattern. These undesirable characteristics necessitate making many structural elements of the airfoil larger and heavier in order to counteract drag-induced forces. The rigid spar, for example, must be made larger in order to possess an increased moment of inertia in the direction of such forces. Similarly, in semirigid airfoils of the type described in the aforesaid copending application in which a cable defines the trailing edge of the airfoil, cambering of the airfoil increases cable tension. This tension creates bending moments in the rigid spar and wing tip structure, requiring heavier elements capable of withstanding stresses induced by the bending moments.

Semirigid airfoils further experience luffing or flagging of the flexible material when the airfoil approaches zero lift conditions. Solutions to this problem to date have not been satisfactory.

It is apparent that solutions to the foregoing camber problems which include making structural elements heavier have many disadvantages and limitations. Among these is a reduced potential load carrying capacity of the airfoil as well as an increase in material and labor costs in fabricating such aircraft structures.

Accordingly, it is an object of the present invention to provide a semirigid airfoil or sailwing structure including a bridle assembly for retarding increases in airfoil camber and improving luffing performance at low lift values, including values near zero lift.

A further object is to provide a semirigid airfoil or sailwing structure with a camber control bridle which is relatively light in weight and inexpensive to manufacture.

Yet another object is to provide a bridle assembly for use with a semirigid airfoil or sailwing structure, including a rigid spar defining a leading edge, a cable defining a trailing edge, and flexible material such as dacron interconnecting the spar and cable, which bridle is secured in tension at a plurality of points along the trailing edge cable such that the cable is pulled at these points both rearwardly and downwardly.

Yet another object is to provide a bridle system which preloads a chordwise tension into a semirigid airfoil in a magnitude which is a function of the ratio of wing span angle of attack distribution to wing span camber distribution, preventing severe camber variation along the span of the airfoil as well as causing a reduction of undesirable variations in angle of attack along the wing span.

A still further object is to provide a bridle assembly as above for use with an aircraft wherein semirigid airfoils or sailwings comprise the aircraft wings in which the bridle assembly is secured in tension at one end thereof to two points, for example, along the trailing edge cable, and at its opposite end to a rearward portion of the aircraft fuselage.

The present invention fulfills the aforementioned objects and overcomes the limitations and disadvantages of prior art solutions to such camber problems by providing a semirigid airfoil of the sailwing type supported from the fuselage of an airborne vehicle. The sailwing includes a hollow rigid spar which defines the leading edge of the wing, a cable secured at one end to a root point on the fuselage and defining the trailing edge of the wing, and flexible material interconnecting the spar and cable to form the aerodynamic airfoil form upon which air will act. A bridle assembly comprising a cable arrangement stressed in tension, interconnects the trailing edge cable of the sailwing with the fuselage. In a preferred embodiment a main bridle cable is split into several branch cable portions, the branch portions being secured to two spaced points along the airfoil trailing edge cable. The main bridle cable portion is secured to a rear portion of the aircraft fuselage, such as at a point adjacent the aircraft tail. Tension in the cable portions of the bridle assembly causes a tensioning of the flexible material in a chordwise direction parallel to a central longitudinal axis of the fuselage.

The invention will be more clearly understood from the following description of specific embodiments together with the accompanying drawings, wherein similar reference characters denote similar elements throughout the several views, and in which.

Figure 1:
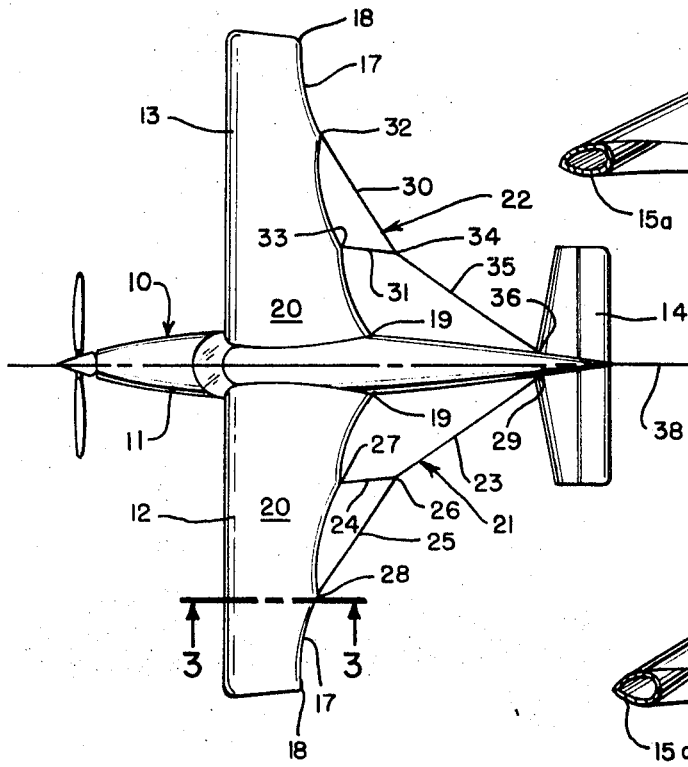
FIG. 1 is a top plan view of an aircraft employing the bridle assembly of the present invention.
Figure 4:
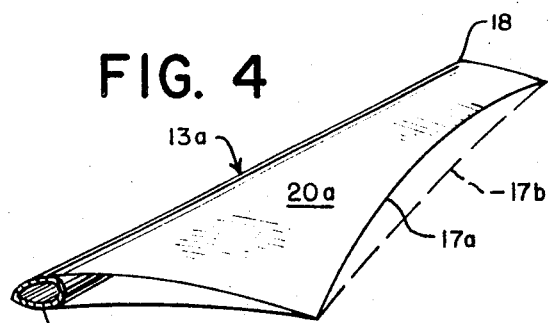
FIG. 4 is a schematic perspective view of a semirigid airfoil or sailwing without the bridle assembly of the present invention.
Figure 5:
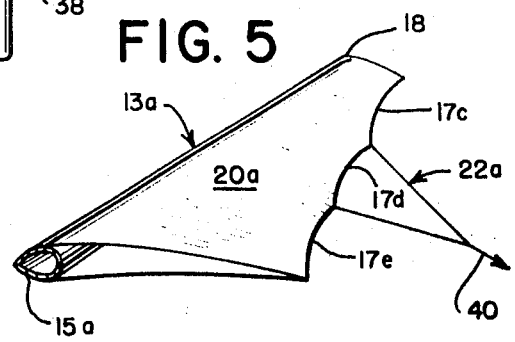
Figure 2:
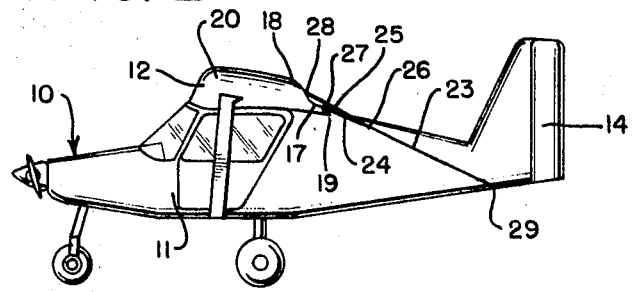
FIG. 2 is a side elevational view of the aircraft shown in FIG. 1.
Figure 3:
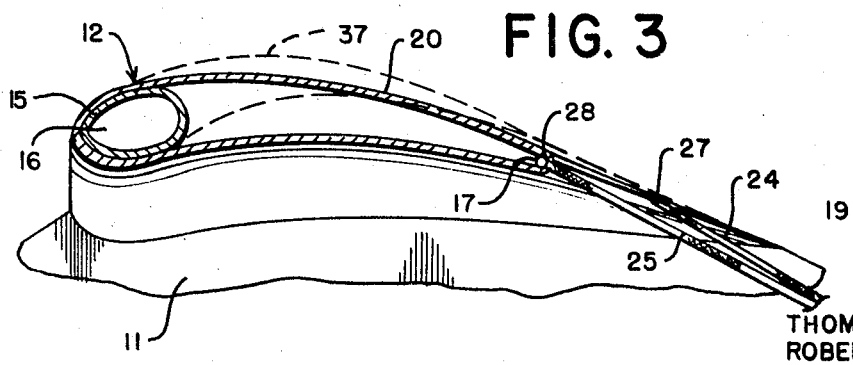
FIG. 3 is a fragmentary sectional elevational view of an airfoil looking along lines 3-3 of FIG. 1.

FIG. 5 is a schematic perspective view of the semirigid airfoil or sailwing shown in FIG. 4 equipped with a two-point bridle assembly. Referring to the drawings, an aircraft generally designated 10 is shown in FIG. 1 having a fuselage 11 which supports wings 12 and 13, as well as tail portion 14. Wings 12 and 13 are similar semirigid airfoils of the sailwing type to that described in the aforesaid copending application. Only one wing is described in detail. Wing 12 is shown in FIG. 3 and has a hollow rigid spar 15 with an opening 16 extending therethrough for the purpose of making the spar lighter in weight, and also to serve as a conduit for electrical or control cables. Spar 15 may have other suitable shapes and may be made from any suitable lightweight material, such as aluminum or titanium or alloys thereof. Spar 15 defines the leading edge of wing 12.

A cable 17 is attached to and extends in tension between a tip 18 on the wing and a root point 19 on fuselage 11. Cable 17 defines the trailing edge of wing 12. The cable can be made of a metallic compound wire with high allowable tensile stresses. Flexible material 20 interconnects spar 15 and cable 17 to form an aerodynamic airfoil form upon which air will act. Material 20 is preferably dacron sailcloth impregnated with silicon, and possesses low stretch and water absorption properties. FIG. 3 shows material 20 stretched over the spar 15 and extending rearwardly to and around trailing edge cable 17. In other preferred embodiments of the invention, material 20 will extend over and around spar 15 and will be seamed to form a hollow portion, not shown. Eyelets or lacing secured to the seam may provide a path through which the trailing edge cable may be passed and secured A bridle assembly shown in FIG. 1 interconnects each of wings 12 and 13 to fuselage 11, the bridle assemblies being designated 21 and 22, respectively. Describing now bridle assembly 21 associated with wing 12, a bridle assembly is shown as a preferred embodiment which is secured at two points along trailing edge cable 17, although the number of trailing edge connection points may be any number. The stem portion 23 of bridle assembly 21 is connected to branch portions 24 and 25 at a junction point 26. Assembly 21 may be fabricated from three separate cables joined, such as by welding, at junction 26, or a single cable may comprise the two branches of a two-point assembly with the stem portion secured to a point along the single cable between its ends. In other embodiments of the invention the respective branches of the bridle assembly may be interwoven.

The remote ends of branch cables 24 and 25 are secured, such as by welding, to the airfoil trailing edge cable 17 at points 27 and 28, respectively. The stem portion 23 is secured to an anchor point 29 on fuselage 11 adjacent tail 14. The bridle cable portions 23, 24 and 25 are always in tension, the magnitude of this tension and resulting tensile stresses in these portions being a function of the air speed of aircraft 10. At higher speeds, tensions increase in all three bridle portions.

The foregoing description of wing 12 and its associated bridle assembly 21 applies to wing 13 and its associated bridle assembly 22. Assembly 22 includes branches 30 and 31 secured at one end of each to trailing edge cable 17 of wing 13 at points 32 and 33, respectively. At their opposite ends, branches 30 and 31 converge at junction point 34 and join a stem portion 35 in a manner described for junction 26. Stem 35 is secured in tension to fuselage 11 at an anchor point 36.

Bridle assemblies 21 and 22 function to retard upward and forward movement of the trailing edge cables during flight due to cambering of wings 12 and 13. FIG. 3 illustrates a phantom outline of airfoil material 20, designated 37, in a position of increased camber which would result from relative movement of air past wing 12 in the absence of bridle assembly 21. The position designated 37 would result from an unbridled trailing edge cable being unable to withstand the forces induced in the flexible material pulling the cable forward and upward. In the configuration designated 37, increased drag forces would cause undesirable decreases in the previously mentioned L/D ratio, with an accompanying drop in wing efficiency because the wing drag would increase, thereby causing a drop in the L/D ratios for given lift values. This undesirable effect is retarded due to the tensile stresses in bridle assembly portions 23, 24 and 25, which tend to maintain points 27 and 28 of cable 17, and thus the material 20 of the airfoil, in their initial positions prior to flight. The result is a more efficient lift pattern with minimum induced and form drag. Furthermore, the angle of attack of wing 12, or the angle at which wing 12 meets the relative flow of air past the wing, is maintained at larger values than would be exhibited by wing 12 without the bridle assembly. This can best be seen in FIG. 3 where the angle of attack for the position designated 37 is lower than that illustrated by the full-line representation of wing 12. The same applies to wing 13.

In the case of semirigid airfoils or sailwings which are warped by remotely controlled systems such as those described in the aforementioned application, for example, use of the bridle assembly will reduce the forces required to warp the wings as a result of reduced binding stresses in wing tip structural elements.

The catenary, or curve, assumed by trailing edge cable 17 for either of wings 12 or 13 is altered by the inclusion of bridle assemblies 21 and 22. FIG. 4 illustrates a cable 17a without a bridle assembly which has assumed a catenary as a result of aerodynamic loading of its associated wing material 20a. Dotted line 17b illustrates the contour of the trailing edge cable in the absence of aerodynamic loading of wing 13a. The addition of a two-point bridle assembly 22a to wing 13a, shown schematically in FIG. 5, causes the airfoil trailing edge cable to assume three distinct catenaries, 17c, 17d and 17e, during flight. In addition, a chordwise tension in material 20a is induced by tension within bridle assembly 22a biasing the airfoil trailing edge cable in the direction of the arrow 40 shown in FIG. 5. The chordwise tension in a direction parallel to a central longitudinal axis 38 of fuselage 11 is preferably preloaded or rigged into the sailwing prior to flight. The magnitude of such chordwise tensions will determine the magnitude of L/D ratios a given values of lift, because increases in such tension will reduce camber and thus will reduce drag, and will further improve the luffing performance of the semirigid airfoil at values of lift approaching zero value since the flexible material will be held taut and will be unable to flag. It is this chordwise tension which allows a predetermined camber variation along the span of the respective airfoil, as well as reducing angle of attack variations along the span of the airfoil. The magnitude of these tensions is a function of both aerodynamic wing loading and air speed.

While a two-point bridle system has been described as a preferred embodiment of the invention, varying ranges of wing aspect ratios will determine the number of trailing edge connection points which will produce optimum wing efficiencies. Aspect ratio, as used here, is the ratio of airfoil span to its mean chord distance.

In embodiments of this invention, not shown, where it is desired to control the magnitude of the chordwise tension, apparatus which will increase the tension in any of bridle branch cables 23, 24 or 25 may be provided and operated by the aircraft pilot.

The embodiments of the invention particularly disclosed are presented merely as examples of the invention. Other embodiments, forms and modifications of the invention coming within the proper scope of the appended claims will of course readily suggest themselves to those skilled in the art.

We claim:

1. Apparatus for an aircraft having a fuselage comprising:
   an airfoil supported by the fuselage, said airfoil including
      a rigid leading edge,
      a cable defining a trailing edge, and
      flexible material interconnecting the leading and trailing edges defining n initial airfoil chamber distribution along the length thereof and for the entire distance between said leading and trailing edges; and
   means for retarding changes in said camber distribution during flight conditions including at least one means in tension connected to said cable defining said trailing edge.

2. Apparatus according to claim 1, wherein said airfoil cable extends between a tip end of said airfoil and a root end, said retarding means comprising a bridle assembly including at least one bridle cable having an end thereof secured to the airfoil trailing edge cable.

3. Apparatus for an aircraft having a fuselage comprising:
   an airfoil supported by the fuselage, said airfoil including
      a rigid leading edge,
      a cable extending between a tip end of said airfoil and a root end defining a trailing edge, and
      flexible material interconnecting the leading and trailing edges defining an initial airfoil camber distribution along the length thereof; and
   means for retarding changes in said camber distribution during flight conditions, said retarding means comprising a bridle assembly including at least one bridle cable secured in tension between the airfoil trailing edge cable and the fuselage.

4. Apparatus for an aircraft having a fuselage, comprising:
   a fuselage having a central longitudinal axis,
   an airfoil having a wing tip and being supported by the fuselage, said airfoil including
      a rigid spar defining a leading edge of the airfoil,
      a cable extending from a root point at the fuselage at one end thereof to said wing tip at its opposite end, said cable defining a trailing edge of the airfoil, and
      flexible material interconnecting the leading and trailing edges and defining a variable aerodynamic airfoil form between said leading and trailing edges; and means including a force transmitting means connected between said airfoil trailing edge and said fuselage for inducing a tension in said material in a direction substantially parallel to said axis to control the camber of the airfoil.

5. Apparatus for an aircraft having a fuselage, comprising:

a fuselage having a central longitudinal axis, an airfoil having a wing tip and being supported by the fuselage, said airfoil including a rigid spar defining a leading edge of the airfoil, a cable extending from a root point at the fuselage at one end thereof to said wing tip at its opposite end, said cable defining a trailing edge of the airfoil, and flexible material interconnecting the leading and trailing edges and defining an aerodynamic airfoil form; and a bridle assembly including a plurality of interconnected cables, said bridle assembly secured in tension at one end to said trailing edge cable and at its opposite end to said fuselage for inducing a tension in said material in a direction substantially parallel to said axis.

6. Aircraft apparatus according to claim 5, wherein said bridle assembly comprises two cables secured to said trailing edge cable at two spaced points for biasing the trailing edge cable rearwardly and downwardly with respect to said airfoil.